INVENTOR.
BENJAMIN F. BREGI
BY
ATTORNEYS 2,994,989
Patented Aug. 8, 1961

2,994,989
GEAR FINISHING MACHINE EMPLOYING MASTER GEARS

Benjamin F. Bregi, Grosse Pointe, Mich., assignor to National Broach & Machine Company, Detroit, Mich., a corporation of Michigan
Filed Sept. 22, 1958, Ser. No. 762,476
3 Claims. (Cl. 51—88)

The present invention relates to a gear finishing machine employing master gears.

In the preferred embodiment of the present invention the gear finishing operation is carried out on a work gear by the simultaneous action of a pair of gear-like tools operating in mesh at opposite sides of the gear. The gear-like tools are preferably in the form of hones characterized in that at least the toothed portions thereof are formed of a solid relatively hard but slightly yieldable and highly resilient resin having abrasive particles embedded therein.

It is an object of the present invention to provide a machine employing a pair of tools in simultaneous mesh at opposite sides of a work piece in which the tools are driven at the same pitch line velocity, and in which a relative feeding movement is accomplished by effecting circumferential advance or retraction of one tool relative to the other.

It is a further object of the present invention to provide a machine as described in the preceding paragraph in which the tools are interconnected by drive means including master gears rigidly connected respectively to the gear-like tools, an idler interposed between the master gears, and means in the connection between one of the master gears and its associated tool for effecting relative circumferential adjustment therebetween.

Other objects and features of the invention will become apparent as the description proceeds, especially when taken in conjunction with the accompanying drawing, which illustrates a preferred embodiment of the invention, wherein:

FIGURE 1 is purely diagrammatic and only the operating components of the complete machine are illustrated.

Figure 1:
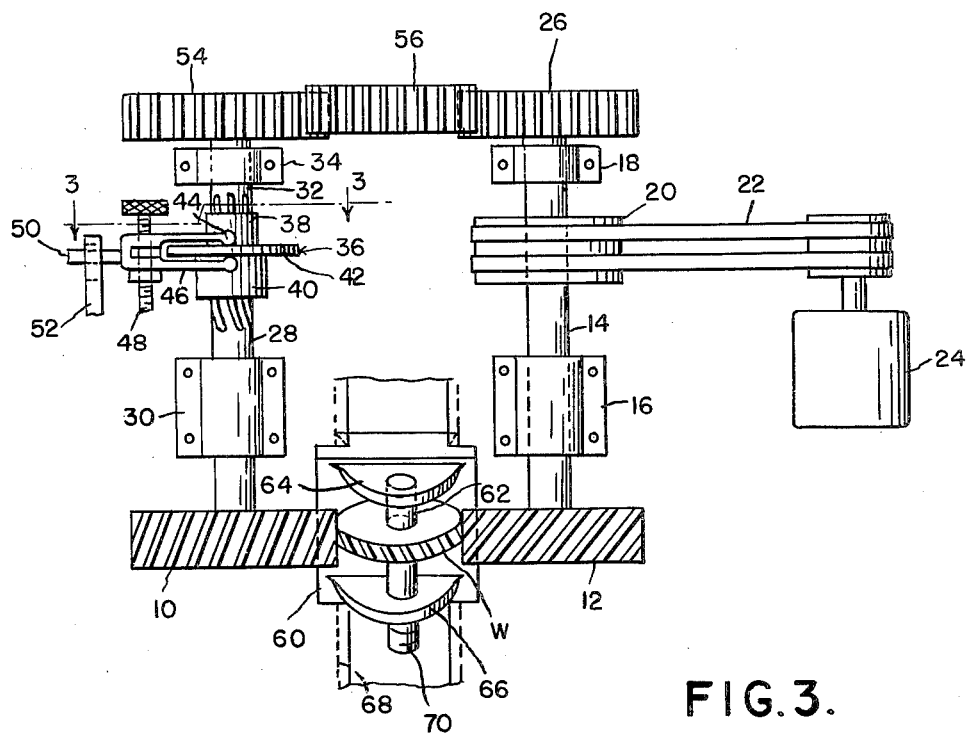
FIGURE 1 is a diagrammatic elevational view illustrating the gear finishing machine.
Figure 3:
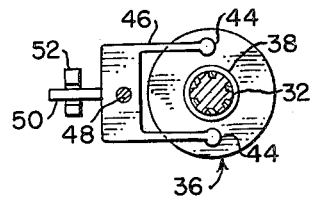
FIGURE 3 is a fragmentary section on the line 3—3, FIGURE 1.

The machine comprises a pair of gear-like tools 10 and 12 which may be gear shaving tools but which, in accordance with the present invention are preferably honing tools. Honing tools are characterized in that at least the toothed portions thereof are formed of a solid relatively hard slightly yieldable but highly resilient resin having abrasive particles embedded therein and exposed at the flanks of the teeth. The tool 12 is rigidly connected to a shaft 14 mounted in bearings 16 and 18 and carrying a pulley 20 intermediate the bearings. The pulley 20 is of course fixed to the shaft 14 and is adapted to be driven through a drive belt 22 by a motor indicated at 24. Rigidly connected to the shaft 14 is a timing master gear 26 preferably having the same number of teeth as the tool 12.

The gear-like tool 10 is rigidly connected to a shaft 28 supported in a bearing 30. In alignment with the shaft 28 is a second shaft 32 supported in bearings diagrammatically indicated at 34. A splined coupling 36 interconnects the shafts 28 and 32. The coupling 36 includes splined portions slidable on the shafts 32 and 28, these splined portions extending at slightly different angles. For example, as illustrated, the upper splined portion of the coupling 36, as indicated at 38, is diagrammatically indicated as having straight splines parallel to the axis of the shaft 32. The lower portion 40 of the coupling is indicated as having helical splines associated with correspondingly inclined splines on the shaft 28. The angularity between the two splined portions is exaggerated in the figure but will normally be relatively small.

Means are provided for effecting movement of the coupling 36 in a direction parallel to the axes of the shafts 28 and 32. It will be readily appreciated that this movement of the coupling 36 will effect a controlled relative circumferential movement between the shafts 32 and 28. In the figure means for effecting this adjustment of the coupling is illustrated as comprising a flange 42 on the coupling engaged by rounded ends 44 of yoke arms 46 at opposite sides thereof. The means for effecting movement of the yoke arms is diagrammatically illustrated as comprising a threaded shaft 48 which it will be understood is mounted for rotation and supported against axial movement. The adjusting structure includes an arm 50 which extends into a guide slot in a member 52 to prevent rotation of the structure including the yoke arms. This structure is purely diagrammatic and any equivalent means for effecting controlled axial adjustment of the coupling 36 may be provided.

Fixedly secured to the shaft 32 is a timing master gear 54 preferably having the same number of teeth as the tool 10 and preferably having its teeth in alignment therewith. Intermediate the timing master gears 26 and 54, there is provided an idler gear 56 which causes the timing master gears 26 and 54 and hence the corresponding tools 12 and 10, to rotate in the same direction.

A work support 60 is provided having thereon rotary support structure including an arbor 62 for supporting a work gear W. The arbor 62 is illustrated as extending between stocks 64 and 66 mounted on the work support 60. Means are provided for effecting a traverse of the work support 60 and this means is herein diagrammatically illustrated as comprising ways 68 in which the work support 60 is movable. Suitable means such for example as a feed screw 70 is provided for effecting a slow traverse of the work support during relatively rapid rotation of the tools 10 and 12.

It will be observed that the work support arbor 62 is inclined equally with respect to the axes of the tools 10 and 12. The machine may be used for finishing either spur or helical gears, the helix angles and/or hand of the tools being different as required by the angular relationship between the axis of the work gear and the axes of the tools. In the illustrated embodiment of the present invention the gear is shown as having teeth of a left hand helix angle. Due to the inclination of the gear relative to the tools the tool 10 is illustrated as having teeth of a right hand helix angle but less than the helix angle of the gear. On the other hand, the teeth of the tool 12 have teeth of a right hand helix angle but greater than the helix angle of the teeth of the gear.

It will be observed that the inclination of the work gear relative to the tools is such that its axis occupies a plane parallel to the axes of both tools. It will further be observed that the direction of traverse of the gear occupies a plane containing the axis of the gear (vertical in the illustrated embodiment of the invention) which is also parallel to the axes of both tools. The direction of traverse within this plane may be parallel to the axis of the gear or inclined both to the axis of the gear and to the axis of the tool. Traverse in a direction parallel to the axes of the tool will normally be employed only in special cases where it is desired to produce teeth on the gear having longitudinally concave flanks.

Normal operation of the machine calls for reversal of the motor. However, since pressure is applied substantially uniformly to opposite sides of the gear teeth, uniformly finished teeth may be produced by an operation in which the motor operates only in one direction. Since this is the case, then the crossed axes angle between the gear and tools and the end of the tools may be selected so as to produce a thrust on the gear in only one direction. When this method is employed it is unnecessary to clamp the gear on its arbor 62 by means of a nut. Instead, the gear may be merely slipped onto a stub arbor and against an abutment thereon.

While in the illustrated embodiment of the present invention the gear is illustrated as in mesh at crossed axes with the tools 10 and 12, certain desirable operations may be performed when the gear is positioned with its axis parallel to the axes of the tools. Thus for example, when the operation is carried out for the primary purpose of removing nicks, it may be unnecessary to use crossed axes. When crossed axes are not employed it is ordinarily unnecessary to provide for traverse of the gear.

Figure 2:
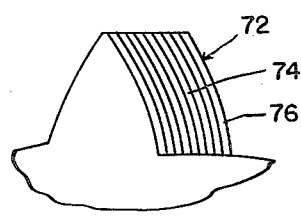
FIGURE 2 is an elevational view of a tooth of a tool showing the manner in which the tooth undergoes wear.

Referring now to FIG. 2 there is illustrated one tooth 72 of a honing tool, the lines 74 thereon indicating progressive wear as the tool is used continuously for unidirectional rotation in mesh with the work piece. It will be observed that the original involute side or flank 76 of the tooth is worn away to produce the successively indicated involute surfaces. Accordingly, the tool may be used until its tooth is consumed to a point where the opposite sides of the teeth intersect at a point at the crest thereof.

Inasmuch as the gear during the finishing operation is in tight mesh with tools engaging the teeth thereof on opposite sides, relative circumferential feed or adjustment between the tool 10 and its timing master gear 54 in the appropriate direction will cause removal of an exactly corresponding amount of stock from the teeth of the gear. Moreover, since the gear is mounted for free rotation the stock removal will be substantially equal at opposite sides thereof.

The drawing and the foregoing specification constitute a description of the improved gear finishing machine employing master gears in such full, clear, concise and exact terms as to enable any person skilled in the art to practice the invention, the scope of which is indicated by the appended claims.

What I claim as my invention is:

1. A gear finishing machine for finishing a work gear comprising a pair of gear-like tools adapted to mesh simultaneously with the work gear and positioned with their axes parallel in coplanar laterally spaced relation, drive means independent of the work gear and coaxial respectively with said tools including a pair of timing gears interconnecting said tools and operable to drive said tools in the same direction at the same pitch velocity, a work support for a work gear positioned to support a work gear between and in mesh with both of said tools with the axis of said gear inclined equally to the axes of both of said tools, said work support including means mounting said gear for free rotation, means for traversing said work support in a direction which occupies a plane containing the axis of a work gear on said work support and parallel to the axes of both of said tools, and a pair of interengaged relatively axially movable helical drive elements interposed between one of said timing gears and its associated tool for selectively advancing or retarding one of said tools circumferentially with respect to the other upon relative axial movement between said elements.

2. A gear finishing machine for finishing a work gear comprising a pair of gear-like tools adapted to mesh simultaneously with the work gear and positioned with their axes parallel in coplanar laterally spaced relation, drive means independent of the work gear and coaxial respectively with said tools including a pair of timing gears interconnecting said tools and operable to drive said tools in the same direction at the same pitch velocity, a work support for a work gear positioned to support a work gear between and in mesh with both of said tools with the axis of said gear inclined equally to the axes of both of said tools, said work support including means mounting said gear for free rotation, means for traversing said work support in a direction which occupies a plane containing the axis of a work gear on said work support and parallel to the axes of both of said tools, and a pair of interengaged relatively axially movable helical drive elements interposed between one of said timing gears and its associated tool for selectively advancing or retarding one of said tools circumferentially with respect to the other upon relative axial movement between said elements, the direction of said traverse being parallel to the axis of the work gear.

3. A gear finishing machine comprising a pair of gear-like tools positioned with their axes parallel in coplanar laterally spaced relation, drive means including gears interconnecting said tools and operable to drive said tools in the same direction at the same pitch velocity, a work support for a work gear positioned to support a work gear between and in mesh with both of said tools with the axis of said gear inclined equally to the axes of both of said tools, said work support including means mounting said gear for free rotation, means for traversing said work support in a direction which occupies a plane containing the axis of a work gear on said work support and parallel to the axes of both of said tools, and means for selectively advancing or retarding one of said tools circumferentially with respect to the other, the direction of said traverse being oblique to the axis of the work gear.

References Cited in the file of this patent

UNITED STATES PATENTS

| | | |
|---|---|---|
| 2,163,438 | Shaw | June 20, 1939 |
| 2,232,408 | Shaw | Feb. 18, 1941 |